United States Patent
Kent

[15] 3,671,058
[45] June 20, 1972

[54] ROLL OUT STEP FOR PICK UP TRUCKS

[72] Inventor: Miles L. Kent, 1330 Hawley Highway, Belding, Mich. 48809

[22] Filed: June 25, 1970

[21] Appl. No.: 49,834

[52] U.S. Cl. ........................................................ 280/166
[51] Int. Cl. ................................................... B60r 3/02
[58] Field of Search ........................... 280/166, 164 R, 164 A

[56] References Cited

UNITED STATES PATENTS

| 1,428,030 | 9/1922 | Heaton | 280/166 |
| 1,616,793 | 2/1927 | Goss | 280/166 |
| 3,229,993 | 1/1966 | Riddle | 280/166 |

*Primary Examiner*—Benjamin Hersh
*Assistant Examiner*—Robert R. Song

[57] ABSTRACT

A retractable step for a pick-up truck, the step being normally stored below the rocker panel where it extends under the pick-up truck door, the step being connected by a mechanism to the door step slides inwardly or outwardly according to the opening and closing of the door.

1 Claim, 4 Drawing Figures

PATENTED JUN 20 1972 3,671,058

INVENTOR
MILES L. KENT

ROLL OUT STEP FOR PICK UP TRUCKS

This invention relates generally to pick-up trucks.

It is generally well known that many persons find it difficult to get in and out of a pick-up truck due to the doorway entrance being located relatively high above the ground. This situation is of course objectionable and in want of improvement.

Accordingly it is a principal object of the present invention to provide a roll-out step for pick-up trucks and which includes a normally retracted step which is outwardly slideable so to permit a person to conveniently and easily step up or step down between a pick-up truck door and the ground.

Another object of the present invention is to provide a roll-out step for pick-up trucks which is located below the rocker panel of the truck and which in a stored position slides under the rocker panel where it is out of the way and does not interfere with the appearance of the vehicle.

Still another object of the present invention is to provide a roll-out step for pick-up trucks wherein the step is automatically made to slide inwardly or outwardly by a mechanism contained and connected to the pick-up truck door so as to move correspondingly to the pivotal movement of the door between a closed and an opened position.

Other objects of the present invention are to provide a roll-out step for pick-up trucks which is simple in design, inexpensive to manufacture, rugged in construction, easy to use and efficient in operation.

These and other objects will be readily evident upon a study of the following specification and the accompanying drawing wherein.

Figure 1:
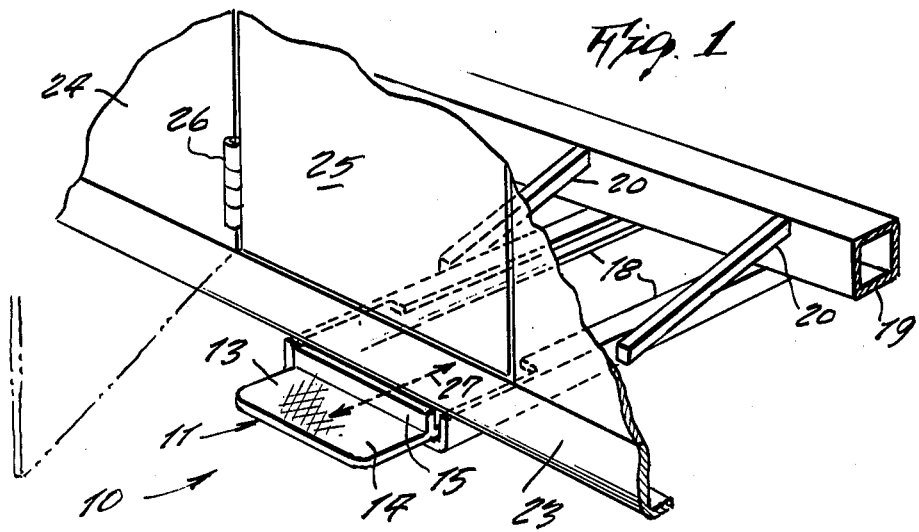
FIG. 1 is a perspective view of the present invention shown mounted under a rocker panel of a pick-up truck.

Referring now to the drawing in detail, the reference numeral 10 represents a roll-out step for pick-up trucks, according to the present invention, wherein there is a slideable unit 11 comprising a flat horizontal plate 12 which at one end is provided with a tread 13 upon the upper side thereof so to form a convenient step 14 upon which a person may place his foot. At the rear of the step 14 there is a low upstanding wall 15 against which a toe or heel of a person's shoe may abut during ascent or descent across the step 14 in entering or departing from the pick-up truck. The rear portion of the panel 12 is provided with a plurality of upper and lower rollers 16 which travel within grooves 17 formed in a pair of channels 18 which serve as tracks between which the step unit 11 travels.

The rear end of the channels 18 are secured to the underside of the truck chasis frame 19, each of the channels being additionally secured thereto by means of a plurality of diagonally extending braces 20.

Figures 2, 3:
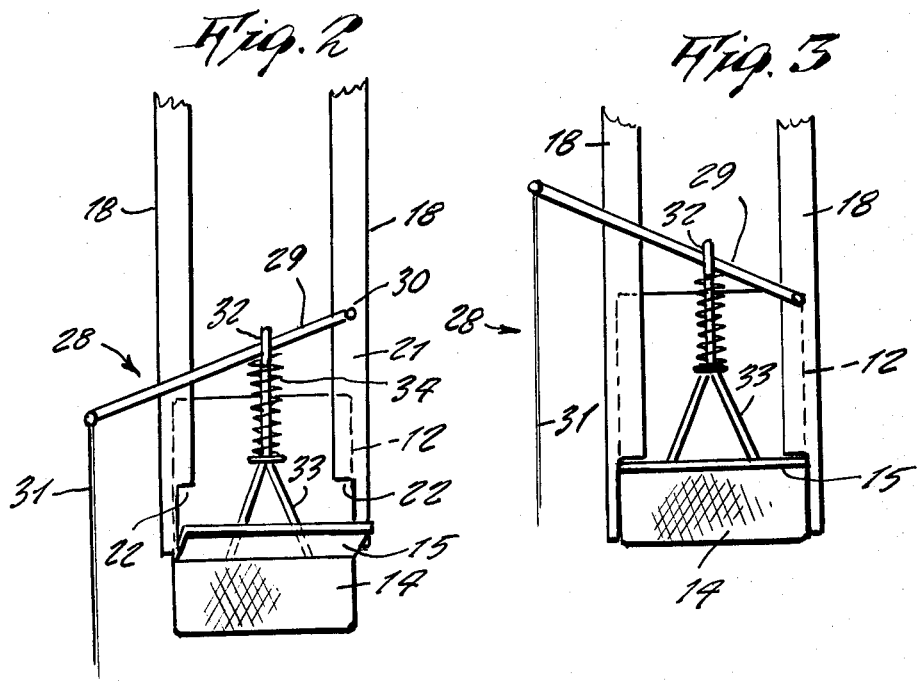
FIG. 2 is a top plan view thereof showing the step slided outwardly for use.
FIG. 3 is a similar view thereof showing the step retracted inwardly in a stored position.
Figure 4:
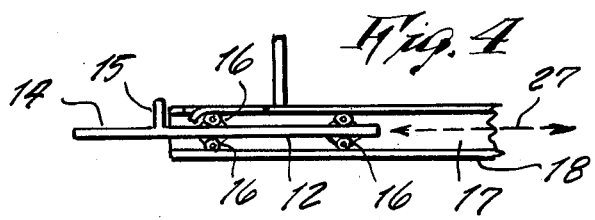
FIG. 4 is a side elevation view of the step supported in a channel track.

It is to be noted that the upper wall 21 of the channel 18 are each provided with a notch 22 at the forward end so as to provide a clearance for the upstanding wall 15 at the rear of the step 14. The notch 22 thus indicates the limit of travel of the step unit as shown in FIGS. 2 and 3 of the drawing.

The step unit 11 and its supporting structure is located below a rocker panel 23 of the pick-up truck 24, and the step unit 11 is positioned so that in operative use it is placed below the truck door 25 which is mounted pivotally free upon hinges 26.

In the present invention, the step unit is made to automatically slide inwardly or outwardly under the rocker panel or forwardly thereof as indicated by the dotted arrow at 27 in FIG. 1. This is accomplished by means of a mechanism 28 shown in FIGS. 2 and 3.

The mechanism 28 includes one end of a stiff rod 29 being attached pivotally free at its one end 30 to one of the channels 18. The opposite end of the rod 29 is connected freely pivotable to one end of a rigid member 31, the opposite end of the rigid member 31 being connected freely pivotable to the door 25 so that pivotal movement of the door will cause the rod 29 to be pivoted. The stiff rod 29 is fitted through an elongated eye opening 32 formed on one end of a bracket 33 which at its opposite end is connected to a rear side of the step 14. A coil spring 34 is fitted around the bracket 33, one end of the spring being held rigid to a longitudinal central part of the bracket while the other end is connected to the stiff rod extending through the elongated eye opening. The elongated eye opening permits the pivotable rod to slide outwardly in a longitudinal direction of the bracket against the spring in case of a freeze-up, which normally maintains the pivotable rod toward the inner end of the elongated opening.

In operative use, it will now be evident that when a person desires to enter or leave the pick-up truck, the door 25 is opened which thus automatically causes the step 14 to slide outwardly from beneath the rocker panel so as to assume the position as shown in FIG. 1 whereby a person may conveniently step thereupon, thus eliminating the difficulty of stepping directly between the doorway and the ground.

Thus there is provided a roll-out step for pick-up trucks which serve a useful purpose and which is necessary on practically all pick-up trucks.

What I now claim is:

1. In a roll-out step for pick-up trucks, the combination of a pick-up truck having an access door, said door being located in the side wall of the truck body, a rocker panel being located below said door, said door normally closing a doorway for access to the interior of said pick-up truck, said door being mounted pivotally free upon hinges secured to said truck body, and said pick-up truck additionally including self-contained means whereby a person may conveniently step between said doorway and a ground, said means comprising a step unit, said step unit being normally retracted beneath said rocker panel in an out-of-the-way position, said step unit being forwardly slidable forwardly of said rocker panel so to be in position for a person wishing to enter said doorway to step upon said step unit prior to stepping into the pick-up truck or when leaving the truck prior to stepping upon the ground, said step unit comprising a horizontal plate with a forward portion thereof forming a step, the upper side of said step being provided with a tread, the rear edge of said step being provided with a vertically upstanding rear wall for said step, a rear portion of said plate being provided with rollers for slidable movement along a track, said track comprising a pair of spaced apart channels, said channels each having a groove, said grooves facing toward each other, and said channels being supported from a frame of said pick-up truck, a mechanism automatically sliding said step unit outwardly or inwardly corresponding to opening or closing of said truck body door, said mechanism comprising a stiff pivotable rod supported pivotably at its one end on one of said channels, the opposite end of said rod being connected to one end of a rigid elongated member which at its other end is connected to said door, said step having a rear side, a bracket secured to said rear side, said bracket having an elongated eye opening, an intermediate part of said rod being fitted through said elongated eye opening, said bracket carrying a spring for permitting said door to open in case of a freeze-up or failure of said mechanism, and said elongated eye opening permitting the pivotable rod to slide outwardly in a longitudinal direction of the bracket against the spring in case of a freeze-up, which normally maintains the pivotable rod toward the inner end of the elongated spring.

* * * * *